Patented May 8, 1951

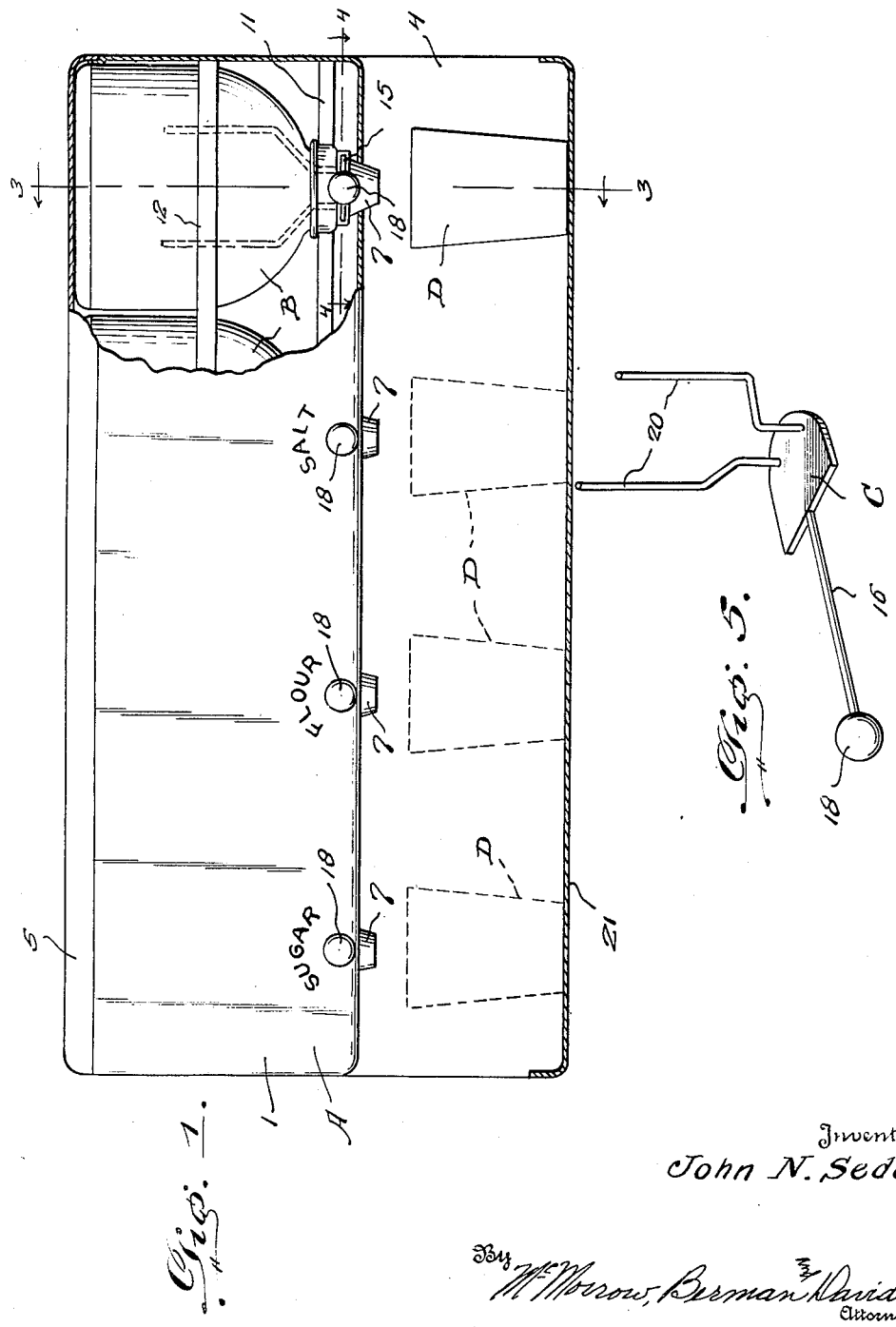

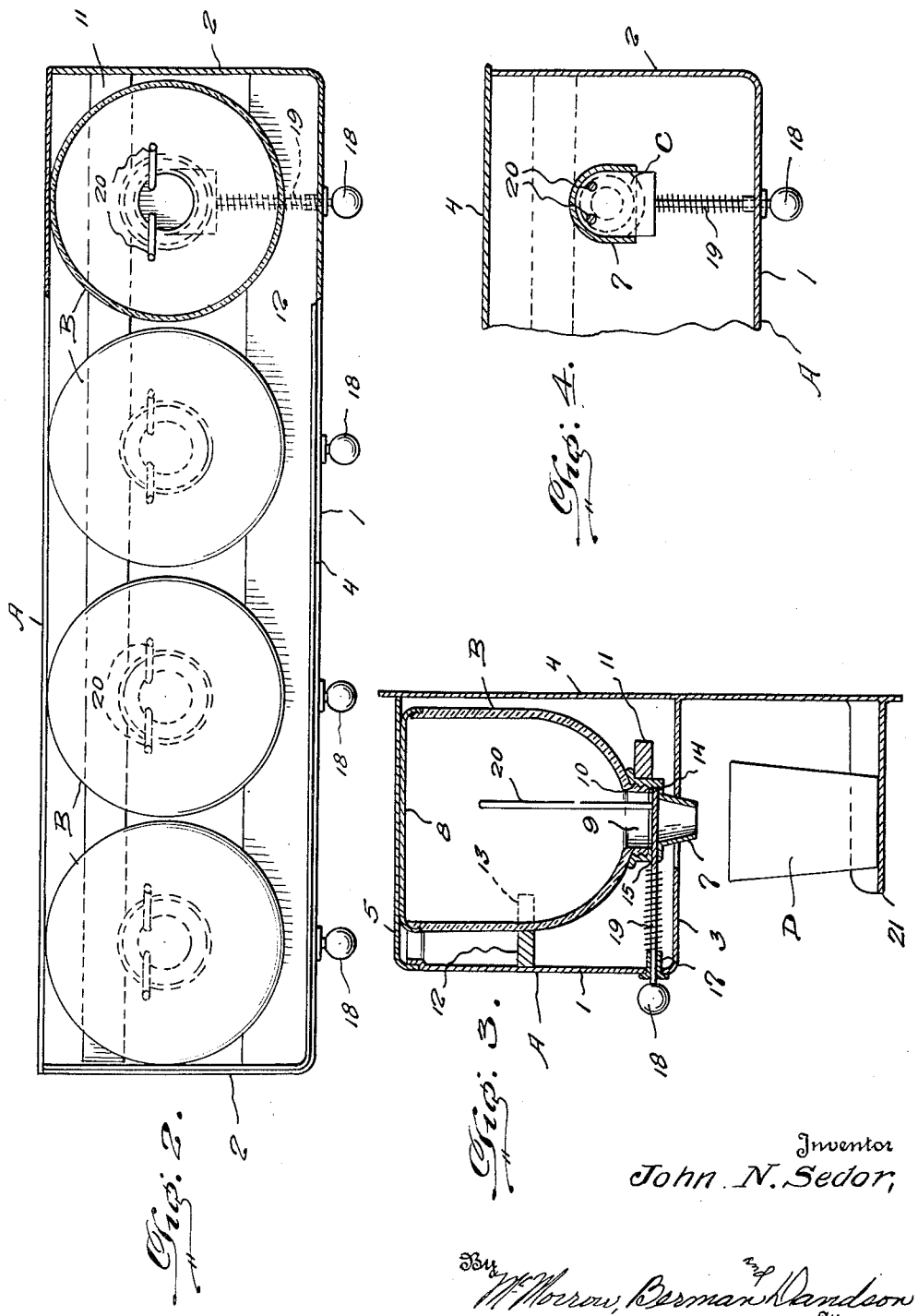

2,551,765

UNITED STATES PATENT OFFICE 2,551,765

CABINET HOUSING SEVERAL INVERTED CONTAINERS, WITH A VALVED SPOUT FOR EACH OF SAID CONTAINERS

John N. Sedor, Chicago, Ill.

Application December 27, 1946, Serial No. 718,848

3 Claims. (Cl. 222—129)

This invention relates to a cabinet housing several inverted containers, with a valved spout for each of said containers and has as its primary object the provision of means for conveniently storing and dispensing foods such as flour, sugar, salt and coffee.

Another object is the provision of means for storing foods in a completely sanitary manner and in such a way that it is conveniently positioned to be dispensed for use.

A still further object of the invention is the provision of means for storing food in a manner to eliminate waste and reduce the working time and labor of housewives.

Other objects and advantages of the invention will appear from the following description when read in the light of the accompanying drawings.

In the drawings:

Fig. 1 is a view in front elevation of the invention, a portion of the view being broken away and appearing in vertical section.

Fig. 2 is a top plan view with the cabinet cover removed, a portion of the view being in horizontal section.

Fig. 3 is a vertical section on the line 3—3 of Fig. 1, looking in the direction indicated by arrows.

Fig. 4 is a horizintal section on the line 4—4 of Fig. 1, looking in the direction indicated by arrows.

Fig. 5 is perspective view of the combined closure plate of agitator.

Describing the invention in detail and having reference to the drawings wherein like parts are designated by similar reference numerals and characters, A is a cabinet or housing provided with a front wall 1, end walls 2, bottom 3, rear wall 4 and removable top 5.

The bottom at spaced intervals along its length is provided with openings 6 through which extend the spouts 7 of a plurality of open neck containers B.

The containers are composed of glass and have removable tops 8 which permit them to be easily filled. Each container has an outlet 9 in its bottom surrounded by an exteriorily threaded collar 10 to which its spout 7 is threadedly attached.

A bar 11 extending longitudinally of the cabinet supports the containers and a second bar 12, notched out as at 13 at spaced intervals along its length, engages the side walls of the containers and properly positions them in the cabinet and prevents them from tipping.

Each spout 7 is interiorly provided with a circumferential shoulder 14 and just above this shoulder, at the front of the spout, there is a slot 15 which slidably receives a horizontally-disposed spout closure plate C of the proper shape to completely close the outlet end of the spout. The plate rests upon the shoulder 14. At its front end the plate is provided with an elongated operating rod 16 which extends through a guide bushing 17 in the front 1 of the cabinet and terminates at the front of the cabinet in a handle or knob 18. A coil spring 19 surrounds the rod 16 and normally holds the plate closure in a closed position, as illustrated in Figs. 3 and 4.

A scraper or agitator for the contents of each container is provided in the form of a pair of upwardly extending arms 20 having their lower ends suitably secured to the closure plate of the container outlet spout.

The back 4 of the cabinet extends below the bottom of the cabinet and supports an outwardly extending shelf 21 upon which rest suitable measuring cups or receiver vessels D, one each of which is below a container outlet spout 7.

The containers can be used to store anything such as sugar, flour, salt or coffee and on the cabinet front above the closure operating handle of each container is imprinted the name of the contents of the particular container.

The cabinet is conveniently placed in the kitchen. It can rest upon the shelf 21 or can be suitably suspended on the wall.

This service cabinet has many advantages. The contents of the containers can be quickly, easily and visually measured as they are dispensed. It is not necessary for the housewife to dip or cup out what she wants. This saves time and overcomes the possibility of spilling. By placing the cabinet immediately convenient to the hand the housewife is saved many steps. The foods are well kept in the glass containers. They are sanitary and will keep the aroma of the coffee and will prevent moisture from reaching the flour, sugar and salt and so prevent them from hardening or becoming mouldy. The cabinet overcomes the possibility of dropping sugar or flour bags or salt and coffee cans or boxes with the resultant mess which often occurs when these foods are carried about the kitchen by the housewife in their individual original containers.

The cabinet eliminates waste. When the housewife wants any of the foods in the containers she has only to pull out on the proper knob until the desired quantity has run into the measuring or receiving cup. When the knob is released the spout closure plate automatically moves to a closed position and stops the flow. The agitator will assure an outward flow when the valve plate is moved to an open position.

What I claim:

1. In a kitchen service device, an upstanding housing comprising a horizontally disposed bottom, a vertically disposed front wall arranged longitudinally of and secured to one of the longitudinal edges of said bottom, a vertically disposed back wall arranged in parallel spaced relation with respect to said front wall and secured to the other of the longitudinal edges of said bottom, an end wall extending between said front and rear walls adjacent each end thereof and secured to the latter wall, and a top extending over the upper end of said front rear and end walls and supported on the latter, said bottom having a plurality of openings arranged in longitudinal spaced relation therealong and spaced from said front rear and end walls, a vertically disposed discharge spout positioned within each of said openings and having the upper end within and supported by the walls of said housing and having the lower end exteriorly of and spaced from said bottom, a plurality of inverted open neck containers adapted to contain food fixedly positioned within said housing, the open neck of each container being in registry with and received within the upper end of the spout adjacent thereto, a horizontally disposed shelf arranged in spaced relation below said bottom and dependingly carried by said housing adapted to support a cup in registry with each of said spouts, and means actuable from without said housing and operatively connected to each of said spouts for controlling the flow of food therethrough, said means comprising a horizontally disposed closure plate positioned within each of said spouts adjacent the upper end thereof and mounted in each of said spouts for movement into and out of bridging relation with respect thereto, an operating rod slidably extending through said front wall and having one end secured to said plate, and a handle on the other end of said rod for moving the plate out of bridging relation with said spout.

2. In a kitchen service device, an upstanding housing comprising a horizontally disposed bottom, a vertically disposed front wall arranged longitudinally of and secured to one of the longitudinal edges of said bottom, a vertically disposed back wall arranged in parallel spaced relation with respect to said front wall and secured to the other of the longitudinal edges of said bottom, an end wall extending between said front and rear walls adjacent each end thereof and secured to the latter walls, and a top extending over the upper end of said front rear and end walls and supported on the latter, said bottom having a plurality of openings arranged in longitudinal spaced relation therealong and spaced from said front rear and end walls, a vertically disposed discharge spout positioned within each of said openings and having the upper end within and supported by the walls of said housing and having the lower end exteriorly of and spaced from said bottom, a plurality of inverted open neck containers adapted to contain food fixedly positioned within said housing, the open neck of each container being in registry with and received within the upper end of the spout adjacent thereto, a horizontally disposed shelf arranged in spaced relation below said bottom and dependingly carried by said housing adapted to support a cup in registry with each of said spouts, means actuable from without said housing and operatively connected to each of said spouts for controlling the flow of food therethrough, and resilient means on said rod for normally biasing said plate into bridging engagement with said spout, said first named means comprising a horizontally disposed closure plate positioned within each of said spouts adjacent the upper end thereof and mounted in each of said spouts for movement into and out of bridging relation with respect thereto, an operating rod slidably extending through said front wall and having one end secured to said plate, and a handle on the other end of said rod for moving the plate out of bridging relation with said spout.

3. A kitchen service device, an upstanding housing comprising a horizontally disposed bottom, a vertically disposed front wall arranged longitudinally of and secured to one of the longitudinal edges of said bottom, a vertically disposed back wall arranged in parallel spaced relation with respect to said front wall and secured to the other of the longitudinal edges of said bottom, an end wall extending between said front and rear walls adjacent each end thereof and secured to the latter walls, and a top extending over the upper end of said front rear and end walls and supported on the latter, said bottom having a plurality of openings arranged in longitudinal spaced relation therealong and spaced from said front rear and end walls, a vertically disposed discharge spout positioned within each of said openings and having the upper end within and supported by the walls of said housing and having the lower end exteriorly of and spaced from said bottom, said spout being provided with an interiorly projecting shoulder adjacent the upper end, there being a slot in the wall of each of said spouts positioned above and spaced from said shoulder, a plurality of inverted open neck containers adapted to contain food fixedly positioned within said housing, the open neck of each container being in registry with and received within the upper end of the spout adjacent thereto, a horizontally disposed shelf arranged in spaced relation below said bottom and dependingly carried by said housing adapted to support a cup in registry with each of said spouts, means actuable from without said housing and operatively connected to each of said spouts for controlling the flow of food therethrough, and resilient means on said rod for normally biasing said plate into bridging engagement with said spout, said first named means comprising a horizontally disposed closure plate positioned within each of said spouts adjacent the upper end thereof and extending through the adjacent slot and supported on the adjacent shoulder for movement into and out of bridging relation with respect to each of said spouts, an operating rod slidably extending through said front wall and having one end secured to said plate, and a handle on the other end of said rod for moving the plate out of bridging relation with respect to the adjacent spout.

JOHN N. SEDOR.

REFERENCES CITED

The following references are of record in the file of this patent:

UNITED STATES PATENTS

| Number | Name | Date |
|---|---|---|
| 287,725 | Rockfellow | Oct. 30, 1883 |
| 456,159 | Park et al. | July 21, 1891 |
| 512,058 | Ricker | Jan. 2, 1894 |
| 710,949 | Calley | Oct. 14, 1902 |
| 714,026 | Perkins | Nov. 18, 1902 |
| 943,649 | Buck | Dec. 21, 1909 |
| 1,017,756 | Head | Feb. 20, 1912 |
| 1,025,717 | Phelps | May 7, 1912 |
| 1,059,169 | Kohn | Apr. 15, 1913 |
| 1,327,389 | Johnson | Jan. 6, 1920 |
| 1,813,131 | Andrassy | July 7, 1931 |
| 2,130,466 | Lapierre | Sept. 20, 1938 |